United States Patent [19]

Simonton

[11] Patent Number: 4,468,741
[45] Date of Patent: Aug. 28, 1984

[54] APPARATUS FOR POSITIONING TOOLING DEVICES RELATIVE TO A BATTERY

[75] Inventor: Robert D. Simonton, Fremont, Ohio

[73] Assignee: Mac Engineering and Equipment Co., Inc., Benton Harbor, Mich.

[21] Appl. No.: 252,920

[22] Filed: Apr. 10, 1981

Related U.S. Application Data

[63] Continuation-in-part of Ser. No. 178,809, Aug. 18, 1980, abandoned.

[51] Int. Cl.³ .............................................. G06F 15/46
[52] U.S. Cl. ..................................... 364/474; 29/730; 228/9; 228/58; 364/478; 364/560
[58] Field of Search ............... 364/474, 475, 130, 140, 364/167, 468, 469, 474, 475, 478, 506, 560, 562; 228/102, 103, 7-10, 12, 58; 198/339-341; 219/79, 80, 86.22, 86.24, 86.41, 86.7, 91.1; 29/623.1-623.5, 593, 407, 33 P, 428-431, 568, 564, 712, 730, 731, 564.1, 564.2; 164/DIG. 1

[56] References Cited

U.S. PATENT DOCUMENTS 3,365,699  1/1968  Foster .
3,427,424  10/1965  Kirschberger et al. .
3,508,318  6/1967  Clingenpeel et al. .
3,576,540  4/1971  Fair .
3,593,308  7/1971  Fagan .................................. 364/900
3,646,521  2/1972  Porter .
3,668,761  9/1970  Buttke et al. .
3,854,889  12/1974  Lemelson ........................ 198/339 X
3,909,300  9/1975  Schenk, Jr. et al. .
3,909,301  9/1975  Schenk, Jr. .
3,941,985  3/1976  Kawase et al. .
4,019,670  4/1977  Holbrook et al. .
4,092,719  5/1978  Salmon .
4,109,188  8/1978  Shima et al. ........................ 29/568 X
4,129,901  12/1978  Masuda .
4,142,237  2/1979  Yamasaki .
4,237,598  12/1980  Williamson ..................... 364/478 X Primary Examiner—Joseph F. Ruggiero
Attorney, Agent, or Firm—Michael, Best & Friedrich

[57] ABSTRACT

A programmable control mechanism for positioning a tool head relative to a battery. The programmable mechanism includes a conveyor means for moving the battery along a first dimensional axis into a work station of the mechanism, a sensing means detects the leading and trailing edges of the battery and means responsive to the sensing means and the conveyor means generates a signal representing the dimensional length of the battery. The signal is utilized by a minicomputer to select a work program suited for that length of battery from a memory bank containing a plurality of such programs. The minicomputer utilizes a selected program to position the tool head relative to the battery so that various successive operations may be performed on the battery by any one of a variety of tools.

21 Claims, 7 Drawing Figures

2

APPARATUS FOR POSITIONING TOOLING DEVICES RELATIVE TO A BATTERY

CROSS-REFERENCE TO RELATED APPLICATION

This is a continuation-in-part of application Ser. No. 178,809, filed Aug. 18, 1980, now abandoned.

BACKGROUND OF THE INVENTION

1. Field of the Invention

The present invention generally relates to a programmable control work performing mechanism and, more particularly to a method and mechanism for positioning a tool support head relative to a battery.

2. Description of the Prior Art

In the manufacture of electric storage batteries, such as the lead-acid batteries used in automobiles, groups of plates and separators are placed within a battery case. The plates and separators are divided into a plurality of cells within the case by a series of non-conductive partitions. An intercell connection is formed generally by disposing the faces of plate connecting lugs adjacent opposite sides of an aperture in the partition wall. A mechanical and electrical joint between the adjacent connectors is formed by extruding a portion of each connector into contact within the aperture and applying a welding current to melt the extruded connector.

Various mechanical processes and tests are required in assembling the aforedescribed storage batteries. Among these processes and tests are: (1) producing an aperture in the partition wall; (2) forming an intercell connection therethrough; (3) testing for a voltage drop between the cells and (4) pressure/vacuum testing the battery casing.

The intercell connections present various problems from a manufacturing standpoint. It is necessary to ensure a secure mechanical and electrical connection, but it is also important to prevent leakage of the electrolyte solution between the cells, U.S. Pat. No. 4,046,062 to Matter discloses a common method of effecting a through-the-partition weld of battery cell connectors.

Another problem encountered is the proper alignment of the intercell connecting lugs with each other and the openings in the partition. Modern battery manufacturing lines are commonly designed to accommodate a plurality of sizes of batteries. This necessarily means that a number of tools are required to effect the aforementioned processes and tests and their movement relative to a particular battery is dependent upon the number of cells in the battery and the horizontal spacing and vertical location of the interconnections. Obviously, to manually move the various tools successively from one cell interconnecting position to another is a time consuming operation which would destroy the production efficiency of the battery manufacturing line. There is, therefore, a need for an automated mechanism for effecting the automatic positioning of the various tools in successive alignment with the desired positions of the partition interconnections for the particular size battery. The problem is further complicated by the fact that the successive through-the-partition interconnections or similar operations must be accomplished at locations which are horizontally spaced from each other in two directions and, at the same time, the tools must be moved vertically into position to effect each interconnection or similar operation and then vertically retracted prior to moving to the next interconnection position.

SUMMARY OF THE INVENTION

According to the present invention, there is provided a programmable control device for successively accurately positioning a tool support head relative to a battery in a universal positioning machine. A conveyor means, such as an endless conveyor belt, is driven by a first stepping motor. The conveyor belt moves the battery along a first dimensional axis path into a work station of the machine. A photocell detects the leading and trailing edges of the battery as it passes through a beam of light prior to entering the work station and generates an enabling signal to a counter. The counter counts the number of steps taken by the stepping motor to move the battery completely past the photocell and ceases counting when the light beam is restored. The number contained in the counter represents a dimensional characteristic of the battery. A minicomputer utilizes that dimensional characteristic to select a specific program based on that particular characteristic from a plurality of positioning programs stored in the minicomputer memory. The minicomputer utilizes the selected program to successively horizontally and vertically position the tool support head relative to the battery partition for proper operation of the tool carried by the support head. In the preferred embodiment, a second stepping motor and a third stepping motor operate to move the tool support head along the two other perpendicular axis paths. When the tool support head is in the proper position for a desired operation to be effected, the minicomputer generates a signal to a tool power control unit. The power control initiates the desired operation and instructs the minicomputer when the operation is completed, so that a new battery can be moved in.

In an alternative embodiment, the selection of the required operation program for the minicomputer may be made manually.

It is, therefore, an object of the present invention to provide an improved method and apparatus for successively positioning a tool support head relative to a battery for effecting through-the-partition interconnections and similar operations on the battery.

It is also an object of the present invention to provide a through-the-partition interconnection positioning machine which is automatically adaptive to variations in battery size, hence, variations on the number and location of the operations to be performed.

Other objects and advantages of this invention will become more apparent during the course of the following description, when read in conjunction with the accompanying drawings.

BRIEF DESCRIPTION OF THE DRAWINGS

In the drawings, wherein like numerals are employed to designate like parts throughout the same.

DETAILED DESCRIPTION OF THE PREFERRED EMBODIMENT

Figure 1:
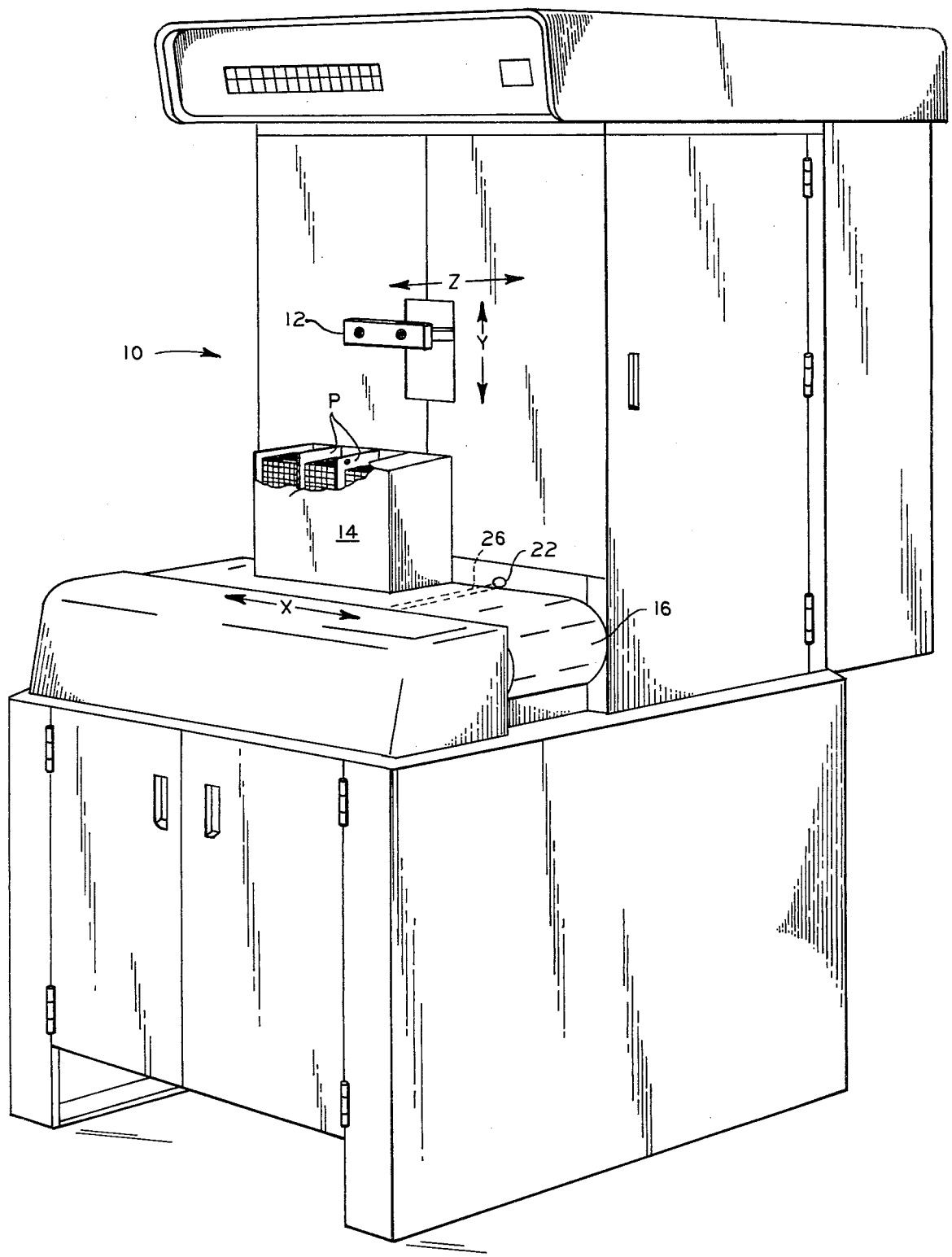
FIG. 1 is a schematic perspective view illustrating the relationship of the component elements in a universal battery positioning machine according to the present invention.

Referring now to drawings, there is illustrated in FIG. 1, a universal tool positioning machine 10 having a tool support head 12 by which a number of tools are positioned relative a workpiece such as a battery 14.

In the preferred embodiment of the invention, the universal machine 10 is a device for positioning a number of tools for performing successive operations through several partitions P which divide a typical battery into a plurality of cells. More broadly stated, the invention contemplates moving a tool head 12 successively relative to a battery for performing a plurality of successive operations on the battery according to a predetermined program selected in accordance with the size of the battery.

Figure 2:
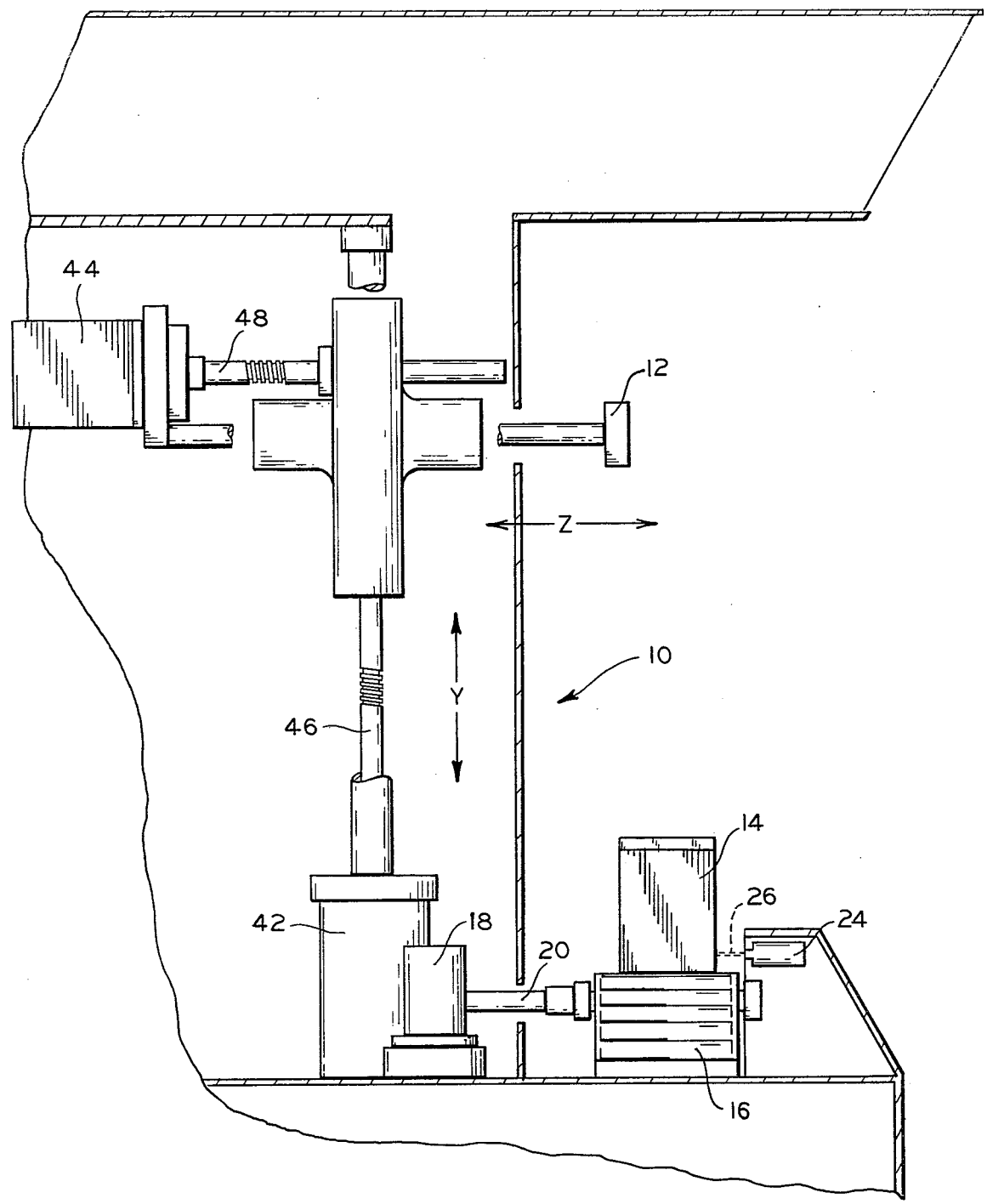
FIG. 2 is a side elevational view, partially broken away, schematically illustrating the machine of FIG. 1.
Figure 3:
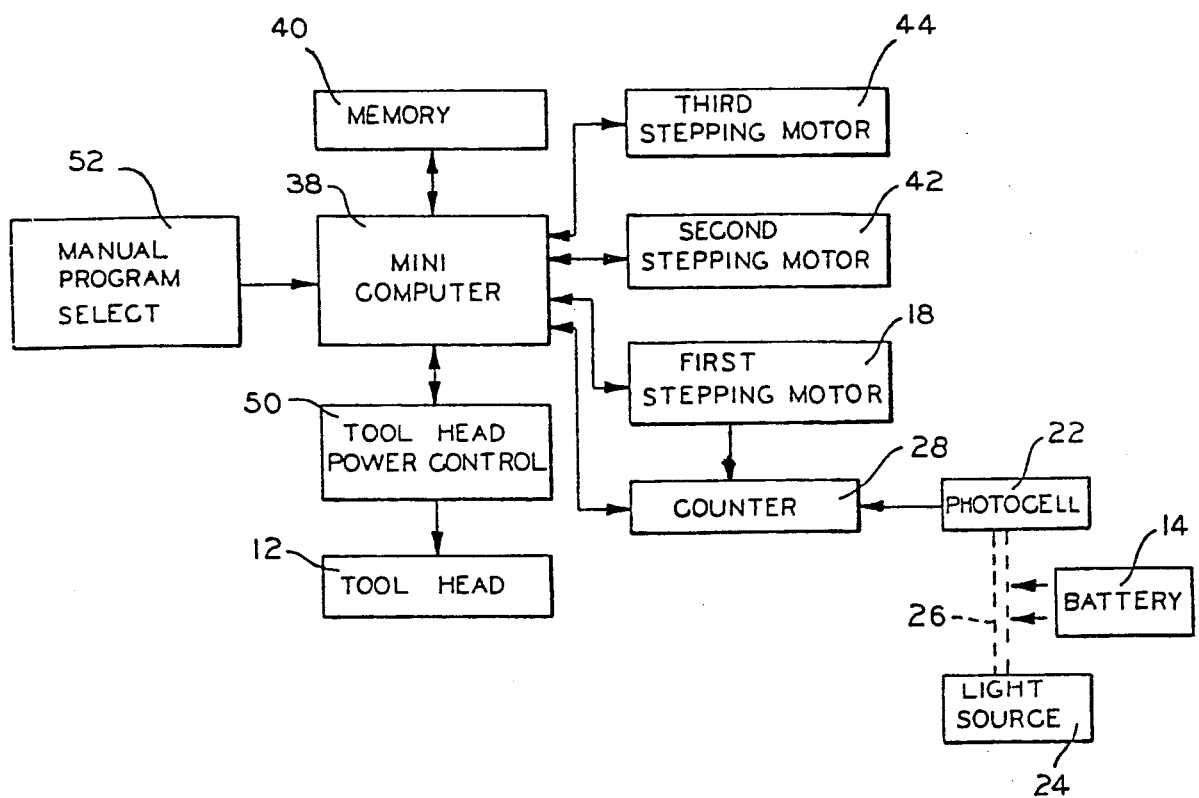
FIG. 3 is a block diagram of the control mechanism according to the present invention.

A workpiece, such as the battery 14, is carried into a work station of the machine 10 by a conveyor means, such as an endless conveyor belt 16. The conveyor belt 16 is supported between two end rolls (not shown) by a plurality of transverse rollers (not shown) to provide for relatively frictionless movement of the conveyor belt 16 as it passes through the machine 10. The conveyor means includes a first stepping motor 18, which is schematically illustrated in FIGS. 2 and 3. The first stepping motor 18 rotates a drive shaft 20 which in turn rotates one of the two conveyor end rolls. The driven end roll frictionally engages the inner surfaces of the conveyor belt 16, causing it to move around the two end rolls. Thus, the conveyor belt 16 moves the battery 14 along a first dimensional axis, designated generally by X, into the work station of the machine 10.

Prior to entering the work station, the battery 14 passes through a sensing means for detecting the leading edge and trailing edges of the battery 14 as it moves on the conveyor belt 16. In the illustrated embodiment, the sensing means consists of a photocell 22 and an associated light source 24 (shown in FIGS. 2 and 3). The light source 24 focuses a narrow beam of light 26 onto the photocell 22. The light beam 26 passes above the conveyor belt 16 in a direction generally perpendicular to the movement of the battery 14 through the machine 10. As the leading edge of the battery 14 passes, the photocell 22 detects the interruption of the beam 26. Similarly, when the trailing edge of the battery 14 passes, the photocell 22 detects the restoration of the beam 26. Such a photoelectric sensing means is well known in the art and it will be appreciated that any sensing device which can detect the leading and trailing edges of the moving battery 14 is contemplated as within the scope of the present invention.

The first stepping motor 18 and the photocell 22 are connected to means for generating a signal representing a dimensional characteristic of the battery 14. As illustrated in FIG. 3, a counter 28 is connected to the first stepping motor 18 so as to register one count for each step movement of the motor 18. The counter 28 is also connected to the photocell 22 so as to function as an enabling switch. When no battery 14 is present, the light beam 26 is uninterrupted and the photocell 22 generates a signal which disables the counter 28. As the leading edge of a battery 14 passes through the light beam 26, the photocell 22 detects the disruption of the beam 26 and generates an enabling signal to the counter 28. The counter 28 counts the number of steps taken by the first stepping motor 18 as it moves the conveyor belt 16 and the battery 14. When the trailing edge of the battery 14 passes by, the light beam 26 is restored and the photocell 22 again disables the counter 28. Thus, the count number contained in the counter 28 represents a dimensional characteristic of the battery 14 which has just passed by.

Figure 5:
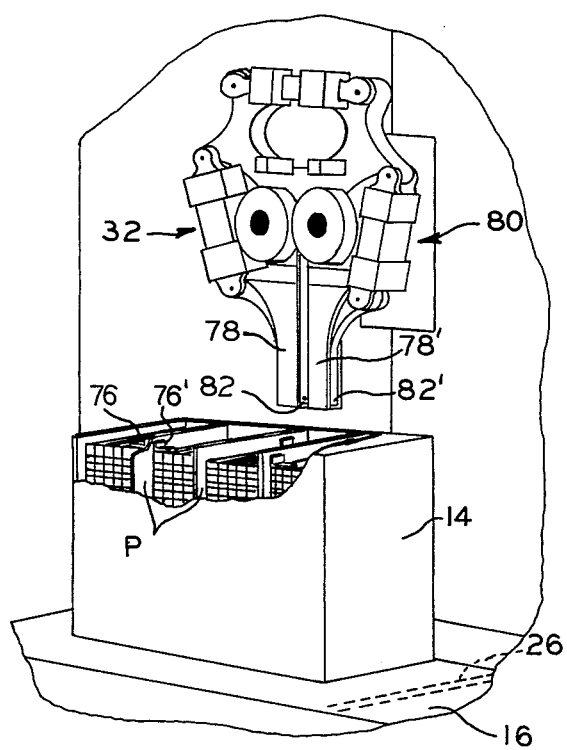
FIG. 5 is a view similar to FIG. 4 illustrating a battery cell interconnection welding head tool.
Figure 6:
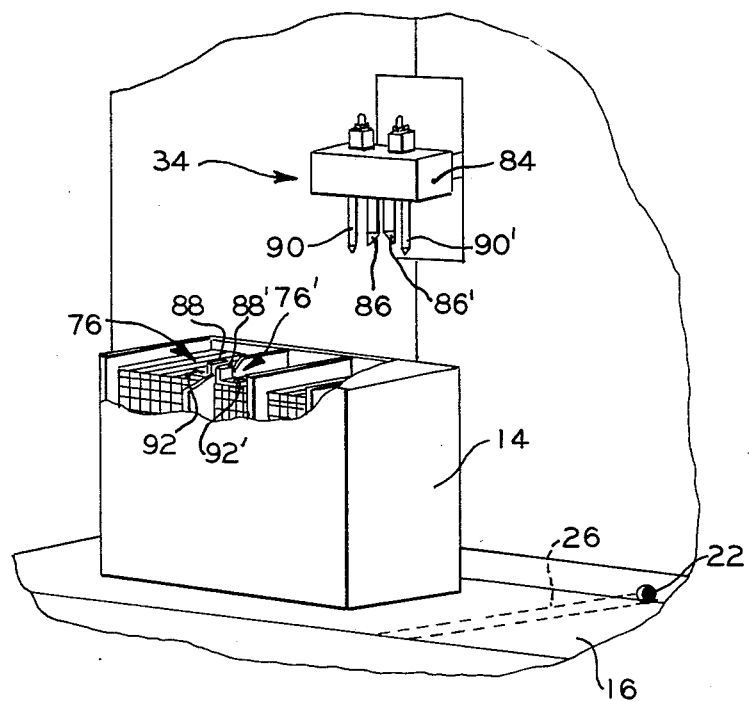
FIG. 6 is a view similar to FIG. 4 illustrating an electronic battery tester.
Figure 7:
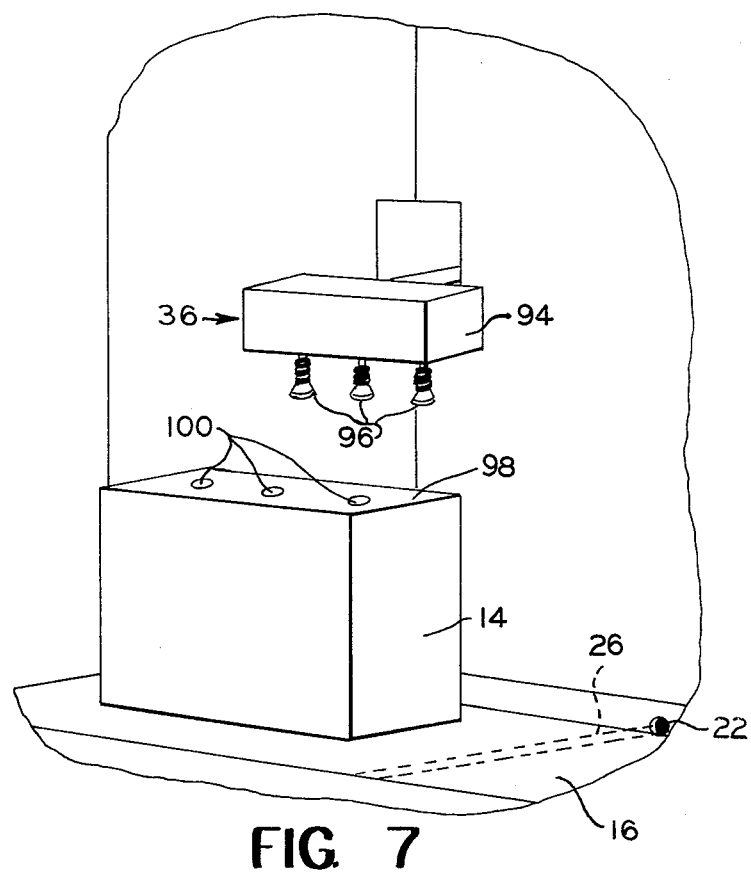
FIG. 7 is a view similar to FIG. 4 illustrating a battery case pressure/vacuum tester.

As illustrated in FIGS. 4 through 7, a number of tools may be employed in the automated production of batteries. These tools, among others, include a case punch head tool 30 (FIG. 4), a welding head tool 32 (FIG. 5), an inter-cell milli-volt drop tester 34 (FIG. 6), and a battery case pressure/vacuum tester head 36 (FIG. 7).

The positioning of these tools 30, 32, 34, and 36 relative to the battery 14 is critical to the proper construction of the battery. For an automated machine to be practicable, it must be sensitive to variations in battery size and adjust the position of the tools for specified operations as well as perform the required operations in rapid fashion. To accomplish these results, the present invention provides a storage means for programming a plurality of specified work programs based on the dimensional characteristics of each battery fed to the machine and a processing means responsive to the signal generating means for selecting a work program from the storage means.

In the illustrated embodiment, the processing means consists of a minicomputer 38 which is connected to the counter 28. The storage means can be a memory bank 40 connected to the minicomputer 38. The structures of the computer 38 and its associated memory bank 40 are conventional in the art. For example, such an arrangement is set forth in detail in U.S. Pat. No. 3,725,651 to Cutter.

The memory 40 is programmed with a plurality of different work programs. Each program contains data and instructions relating to the proper positioning of the tools 30, 32, 34, or 36, based upon differing dimensional characteristics of the battery 14. As the battery 14 enters the work station, the counter 28 generates a signal representing the dimensional characteristic of that battery 14. The minicomputer 38 is responsive to the counter 28 and selects a work program for a specified tool from the memory 40 which corresponds to a battery of that specific characteristic. When the minicomputer 38 has selected the proper work program, it generates a reset signal to the counter 28 to clear the count to zero until the next battery to be worked on interrupts the light beam 26 and enables the counter 28 to count again.

Having retrieved the proper work program from the memory 40, the minicomputer 38 generates signals which control the conveyor means 16 and a servomotor means so as to properly successively position the tool head 12 relative to the battery 14 for a series of desired operations by whatever tool is mounted on the tool support 12. The servomotor means consists of a second stepping motor 42 and a third stepping motor 44 which move the tool head 12 along two other dimensional axis paths. The second stepping motor 42 and the third stepping motor 44 operate drive shafts 46 and 48, respectively, to move the tool head 12 along other dimensional axes, designated as Y and Z. The drive mechanisms are conventional in the art and form no part of the present invention.

The signals generated by the minicomputer 38 instruct the three stepping motors 18, 42, and 44 to operate so as to position the tool head 12 relative to the battery 14 for a desired operation. The operation of the stepping motors 18, 42, and 44 is monitored by the minicomputer 38 to ensure compliance with a given request.

When the stepping motors 18, 42, and 44 have positioned the battery 14 properly, a signal is generated to a power control unit 50 (see FIG. 3) which, in turn, controls the operation of the tool. The power control unit 50 not only initiates the operation of the respective tools but instructs the minicomputer 38 as to when the operation is completed. The stepping motors 18, 42, and 44 will then be activated by the minicomputer 38 to move the tool head 12 and the battery 14 into position for the next operation, or to move the battery 14 out of the machine 10 and permit the entry of the next battery.

The present invention also includes a manual program selector unit 52 (see FIG. 3) which is connected to the minicomputer 38. The manual program selector 52 permits an operator of the machine 10 to select a specific work program from the memory bank 40. When the minicomputer 38 receives a signal from the manual program selector unit 52, it will select the requested program from the memory bank 40 and repeatedly utilize that program until instructed by the manual program selector unit 52 to return to normal operation. When a program is manually selected, the minicomputer 38 will ignore any signal generated by the counter 28. Thus, the counter 28 and the photocell 22 may be turned off by the minicomputer 38 when a manually selected program is in use. The use of the manual program selector unit 52 is more efficient than the normal sensing and selecting operation performed by the minicomputer 38 when it is known that only a particular size battery, requiring a particular work program, will be received by the machine 10.

Figure 4:
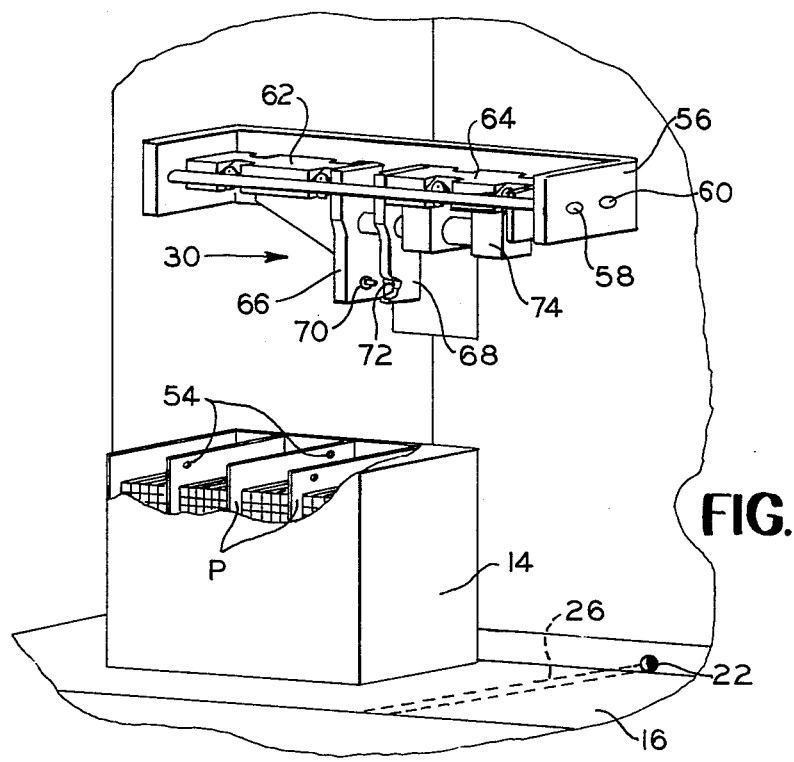
FIG. 4 is a perspective view schematically illustrating a battery case punch head tool employed in the machine.

Briefly, the case punch head tool 30 illustrated in FIG. 4 is detachably connected by suitable means (not shown) to the tool head 12 and moved into various operating positions for successively producing apertures 54 in the partitions P of the battery 14. Generally, the tool 30 comprises a U-shaped mounting frame 56 adapted to be connected to the machine tool head 12. The frame 56 is provided with a pair of horizontally disposed parallel rails 58 and 60 for carrying two relatively movable carriages 62 and 64. Each carriage 62 and 64 is provided with a depending tool holder 66 and 68, respectively, with the lower extremity of the tool holder 66 carrying a punch 70 and the lower extremity of the tool holder 68 carrying an axially aligned punch receiving aperture 72. The carriages 62 and 64 may be moved relative to each other by a power cylinder 74. In operation, the punch and die tool 30 are moved into a working position about the battery partition P with the tool holder 66 and 68 on opposite sides thereof and are moved relative to each other to produce the apertures 54 in the partitions P. The operation of the tool 38 is controlled by a suitable work program as previously described.

Referring now to FIG. 5, the welding head tool 32 illustrated therein is adapted to be detachably connected (not shown) to the tool head 12 and moved into a working position as previously described for fusing a pair of opposed, upstanding, cell connected lugs 76 and 76' together. More particularly, the welding head tool 32 includes an electrode unit having a pair of opposed copper electrode jaws 78 and 78' for squeezing and fusing the opposed battery lugs 76 and 76' together through the apertures 54 in the battery partitions P. A separate extruder unit 80 having a pair of opposed forging plungers 82 and 82', which pass through apertures in the electrode jaws 78 and 78', first extrudes portions of the lugs 76 and 76' into the apertures 54 of the partitions P. Then a welding current is passed through the electrode jaws 78 and 78' to fuse the lugs together. The welding head 32 is more fully described in a copending application Ser. No. 178,808, filed Aug. 18, 1980 U.S. Pat. No. 4,368,373, and assigned to the same assignee. The operation of the welding head 32 is controlled by a suitable work program as described above.

Briefly, the inter-cell milli-volt drop tester 34 illustrated in FIG. 6 is detachably connected by suitable means (not shown) to the tool head 12 and moved into a working position as previously described for ascertaining voltage drops, if any, between adjacent battery cells, thus testing the adequacy of the inter-cell weld connections. Generally, the tester 34 includes a conventional electronic device 84 having a pair of depending electrodes 86 and 86' for contacting the vertically extending flange portions 88 and 88' of the battery cell connecting lugs 76 and 76', respectively. Also a pair of rod type electrodes 90 and 90' depend from the device 84 for contacting the horizontal flange portions 92 and 92' of the battery lugs 76 and 76'. The operation of the tester 34 is conventional and is controlled by a suitable work program as previously mentioned.

Referring now to FIG. 7, the case pressure/vacuum tester 36 illustrated therein is adapted to be detachably connected to the tool head 12 by means (not shown) and moved into a working position as described above. Briefly, the tester 36 comprises a housing 94 defining a chamber having a plurality of suction devices 96 depending therefrom for contacting the top surface 98 of the battery 14 over apertures 100 provided therein. The operation of the pressure/vacuum tester 36 may be controlled by a suitable work program as described above.

Although this invention has been illustrated and described in this preferred embodiment, it will be apparent to those skilled in the art that various changes and modifications may be made therein without departing from the spirit of the invention.

What is claimed is:

1. A programmable mechanism for successively positioning a tool head relative to a workpiece requiring multiple work locations comprising:
   a. conveyor means for moving a workpiece along a first dimensional axis path into a first work station;
   b. servomotor means for moving the tool head along two other dimensional axis paths while retaining the tool head against movement along the first path;
   c. sensing means for detecting a leading edge and a trailing edge of the workpiece as its moves along the conveyor means;
   d. means responsive to said sensing means and said conveyor means for generating a signal representing a dimensional characteristic of a workpiece;
   e. storage means for storing a plurality of work location programs based on a dimensional length of the workpiece; and f. processing means responsive to said signal generating means for selecting a work location program for controlling said conveyor means and said servomotor means so as to successively position the tool head relative to the workpiece.

2. A programmable mechanism according to claim 1 wherein said conveyor means comprises a first stepping motor which drives an endless conveyor belt supported between two end rolls by a plurality of transverse rollers.

3. A programmable mechanism according to claim 1 wherein said servomotor means comprises a plurality of stepping motors for moving the head along axis paths which are perpendicular to each other and to the first dimensional axis path.

4. A programmable mechanism according to claim 1 wherein said sensing means comprises a light source and a photocell.

5. A programmable mechanism according to claim 2 wherein said means responsive to said sensing means for generating a signal representing a dimensional characteristic of the workpiece comprises a counter which counts the number of steps taken by the first stepping motor.

6. A programmable mechanism for positioning a tool head relative to workpiece comprising
   a. conveyor means for moving the workpiece along a first dimensional axis into a work station;
   b. servomotor means for moving the work head along two other dimensional axis paths while retaining the tool head against movement along the first path;
   c. storage means for storing a plurality of work location programs based on the size of the workpiece; and
   d. means for selecting a work location program for controlling said conveyor means and said servomotor means so as to properly position the tool head relative to the workpiece.

7. A programmable mechanism for positioning a tool head relative to a battery comprising:
   a. conveyor means for moving the battery along a first dimensional axis path into a first work station;
   b. servomotor means for moving the tool head along two other dimensional axis paths while retaining the tool head againt movement along the first path;
   c. sensing means for detecting a leading edge and a trailing edge of the battery as it moves along the conveyor means;
   d. means responsive to said sensing means and said conveyor means for generating a signal representing a dimensional characteristic of the battery;
   e. storage means for storing a plurality of work location programs based on the dimensional length of the battery; and
   f. processing means responsive to said signal generating means for selecting a work location program for controlling said conveyor means and said servomotor means so as to position the tool head relative to the battery.

8. A programmable mechanism for positioning a tool head relative to a battery casing having a plurality of spaced, parallel, cell separating partitions comprising:
   a. conveyor means for moving the battery along a first dimensional axis path into a work station;
   b. servomotor means for moving the work head along two other dimensional axis paths while retaining the tool head against movement along the first path;
   c. storage means for storing a plurality of work location programs based on the size of the battery; and
   d. means for selecting a work location program for controlling said conveyor means and said servomotor means so as to properly successively position the tool head relative to the battery partitions.

9. A programmable mechanism according to claim 8 including a punch and die tool detachably connected to the tool head for producing apertures at spaced locations in the partitions of the battery casing.

10. A programmable mechanism according to claim 8 including a welding head tool detachably secured to the tool head for producing welded cell connections through the partitions of the battery casing.

11. A programmable mechanism according to claim 8 including an inter-cell milli-volt drop tester detachably secured to the tool head for ascertaining the voltage drop between the adjacent cells of the battery.

12. A programmable mechanism according to claim 8 including a pressure/vacuum tester detachably secured to the tool head for ascertaining the porosity of the battery casing.

13. A programmable control mechanism for successively positioning a welding head relative to a workpiece requiring multiple welds comprising:
   a. conveyor means for moving the workpiece along a first dimensional axis path into a first welding station;
   b. servomotor means for moving the welding head along two other dimensional axis paths while retaining the tool head against movement along the first path;
   c. sensing means for detecting a leading edge and a trailing edge of the workpiece as it moves along the conveyor means;
   d. means responsive to said sensing means and said conveyor means for generating a signal representing a dimensional characteristic of the workpiece;
   e. storage means for storing a plurality of welding location programs based on the dimensional length of the workpiece; and
   f. processing means responsive to said signal generating means for selecting a welding location program for controlling said conveyor means and said servomotor means so as to position the welding head relative to the workpiece.

14. A control device according to claim 13 wherein said conveyor means comprises a first stepping motor which drives an endless conveyor belt supported between two end rolls by a plurality of transverse rollers.

15. A control device according to claim 13 wherein said servomotor means comprises a plurality of stepping motors for moving the welding head along axis paths which are perpendicular to each other and to the first dimensional axis path.

16. A control device according to claim 13 wherein said sensing means comprises a light source and a photocell.

17. A control device according to claim 14 wherein said means responsive to said sensing means for generating a signal representing a dimensional characteristic of the workpiece comprises a counter which counts the number of steps taken by the first stepping motor.

18. A programmable control mechanism for positioning a welding head relative to a workpiece, such as a battery, comprising:

a. conveyor means for moving the workpiece along a first dimensional axis path into a first welding station;
b. servomotor means for moving the welding head along two other dimensional axis paths while retaining the tool head against movement along the first path;
c. sensing means for detecting a leading edge and a trailing edge of the workpiece as it moves along the conveyor means;
d. means responsive to said sensing means and said conveyor means for generating a signal representing a dimensional characteristic of the workpiece;
e. storage means for storing a plurality of welding location programs based on the dimensional length of the workpiece; and
f. processing means responsive to said signal generating means for selecting a welding location program for controlling said conveyor means and said servomotor means so as to position the welding head relative to the workpiece.

19. A programmable control mechanism for positioning a welding head relative to a workpiece comprising:
a. conveyor means for moving the workpiece along a first dimensional axis path into a welding station;
b. servomotor means for moving the welding head along two other dimensional axis paths while retaining the tool head against movement along the first path;
c. storage means for storing a plurality of welding location programs based on the size of the workpiece; and
d. means for selecting a welding location program for controlling said conveyor means and said servomotor means so as to properly position the welding head relative to the particular workpiece.

20. Apparatus for positioning a work head and a work piece relative to each other to facilitate the accomplishment of work on the workpiece by the work head, said apparatus comprising
a frame,
a conveyor for transporting work pieces relative to said frame on a first rectilinear path,
means for incrementally advancing said conveyor so as to incrementally advance individual work pieces relative to the frame along the first path,
a work head adapted for carrying a mechanism for performing work on the workpiece and supported on said frame against movement in the direction of the first path and for movement along a second rectilinear path in a plane parallel to the plane of said first path and in a direction perpendicular to said first path and for movement along a third rectilinear path perpendicular to said first and second paths,
means for incrementally displacing said work head along each of said second and third paths,
means for storing a plurality of work programs in a memory bank, at least one of said programs involving a predetermined incremental movement of the workpiece along said first path to a predetermined position, followed by a predetermined incremental movement of said work head to a predetermined position along said second path, followed by a predetermined incremental movement of said work head along said third path and toward said work piece to a predetermined position, followed by operation of the mechanism to perform work on the work piece, and followed by a predetermined incremental movement of said work head along said third path and away from said first path,
and processing means responsive to a signal for selecting a work program for controlably moving said conveyor and said work head so as to relatively position the work head and the workpiece.

21. Apparatus for positioning a work head and a work piece relative to each other to facilitate the accomplishment of work on the workpiece by the work head, said apparatus comprising
a frame,
a conveyor for transporting work pieces relative to said frame on a first rectilinear path,
means for incrementally advancing said conveyor so as to incrementally advance individual work pieces relative to the frame along the first path,
a work head adapted for carrying a mechanism for performing work on the workpiece and supported on said frame against movement in the direction of the first path and for movement along a second rectilinear path in a plane parallel to the plane of said first path and in a direction perpendicular to said first path and for movement along a third rectilinear path perpendicular to said first and second paths,
means for incrementally displacing said work head along each of said second and third paths,
means for storing a plurality of work programs in a memory bank, at least one of said programs involving a predetermined incremental movement of the workpiece along said first path, and predetermined incremental movement of said work head along said second and third paths so as to locate said workpiece and said work head relative to each other in predetermined location so as to facilitate the performance of work on the workpiece by the work head,
and processing means responsive to a signal for selecting a work program for controlably moving said conveyor and said work head so as to relatively position the work head and the workpiece.

* * * * *